US007787414B2

(12) United States Patent
Le Faucheur et al.

(10) Patent No.: US 7,787,414 B2
(45) Date of Patent: Aug. 31, 2010

(54) RESERVING NETWORK RESOURCES FOR A COMMUNICATION SESSION

(75) Inventors: Francois L. Le Faucheur, Valbonne (FR); Kent K. Leung, Los Altos, CA (US); Jayaraman R. Iyer, Sunnyvale, CA (US); Viren K. Malaviya, Cupertino, CA (US); Anand K. Oswal, Santa Clara, CA (US); David P. Lindert, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 486 days.

(21) Appl. No.: 11/180,824

(22) Filed: Jul. 12, 2005

(65) Prior Publication Data

US 2007/0014256 A1 Jan. 18, 2007

(51) Int. Cl.
*H04W 4/00* (2009.01)
(52) U.S. Cl. .................. 370/328; 455/438; 455/439
(58) Field of Classification Search .................. 370/328; 455/438–439
See application file for complete search history.

(56) References Cited

U.S. PATENT DOCUMENTS

| 6,154,778 A | 11/2000 | Koistinen et al. ........... 709/228 |
| 6,519,254 B1 * | 2/2003 | Chuah et al. ................. 370/389 |
| 6,567,415 B1 | 5/2003 | Elwalid et al. ............... 370/412 |
| 6,636,482 B2 | 10/2003 | Cloonan et al. ............. 370/230 |
| 6,675,229 B1 | 1/2004 | Bruno et al. ................. 719/328 |
| 6,914,883 B2 | 7/2005 | Dharanikota ............. 370/230.1 |
| 2002/0003789 A1 | 1/2002 | Kim et al. .................... 370/338 |
| 2002/0015395 A1 * | 2/2002 | Karagiannis ................ 370/338 |
| 2002/0083174 A1 | 6/2002 | Hayashi et al. ............. 709/225 |
| 2004/0018841 A1 * | 1/2004 | Trossen ...................... 455/436 |
| 2004/0137888 A1 * | 7/2004 | Ohki .......................... 455/417 |

OTHER PUBLICATIONS

Nx Networks, "Using TOS/DiffServe Quality of Service (QOS) Policies," http://www.support.nsgdata.com/RouterDocs/sw_docs/or_54/qos/diffserv.htm, 23 pages, 2000.
Cisco Systems, Inc., "DiffServ—The Scalable End-To-End QoS Model," Cisco Systems White Paper, 19 pages, 2001.

* cited by examiner

*Primary Examiner*—Lester Kincaid
*Assistant Examiner*—Steven Lim
(74) *Attorney, Agent, or Firm*—Baker Botts L.L.P.

(57) ABSTRACT

Requesting a network resource includes facilitating a communication session between a mobile node and an endpoint. A trigger event is received at a first anchor point associated with the mobile node. The trigger event indicates that reservation of a network resource is being requested for the communication session. A second anchor point associated with the endpoint is identified. Reservation of the network resources for the communication sessions is initiated over a tunnel between the first anchor point and the second anchor point.

24 Claims, 4 Drawing Sheets

RESERVING NETWORK RESOURCES FOR A COMMUNICATION SESSION

TECHNICAL FIELD

This invention relates generally to the field of communications and more specifically to reserving network resources for a communication session.

BACKGROUND

A communication network may establish a communication session for a mobile node that allows the mobile node to communicate with other endpoints. Establishing a communication session typically involves reserving resources of the network for the communication session. Accordingly, techniques are implemented to reserve network resources to support the communication session.

Known techniques, however, are not efficient in certain situations. It is generally desirable to have efficient techniques in certain situations.

SUMMARY OF THE DISCLOSURE

In accordance with the present invention, disadvantages and problems associated with previous techniques for reserving network resources may be reduced or eliminated.

According to one embodiment of the present invention, requesting a network resource includes facilitating a communication session between a mobile node and an endpoint. A trigger event is received at a first anchor point associated with the mobile node. The trigger event indicates that reservation of a network resource is being requested for the communication session. A second anchor point associated with the endpoint is identified. A tunnel between the first anchor point and the second anchor point is established. A path message operable to request reservation of the network resource is sent through the tunnel.

Certain embodiments of the invention may provide one or more technical advantages. A technical advantage of one embodiment may be that a tunnel may be established between the anchor points of the mobile nodes of a communication session. The tunnel may provide for more efficient reservation of network resources. Another technical advantage of one embodiment may be that the tunnel may be used to aggregate network reservation for a number of communication sessions.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
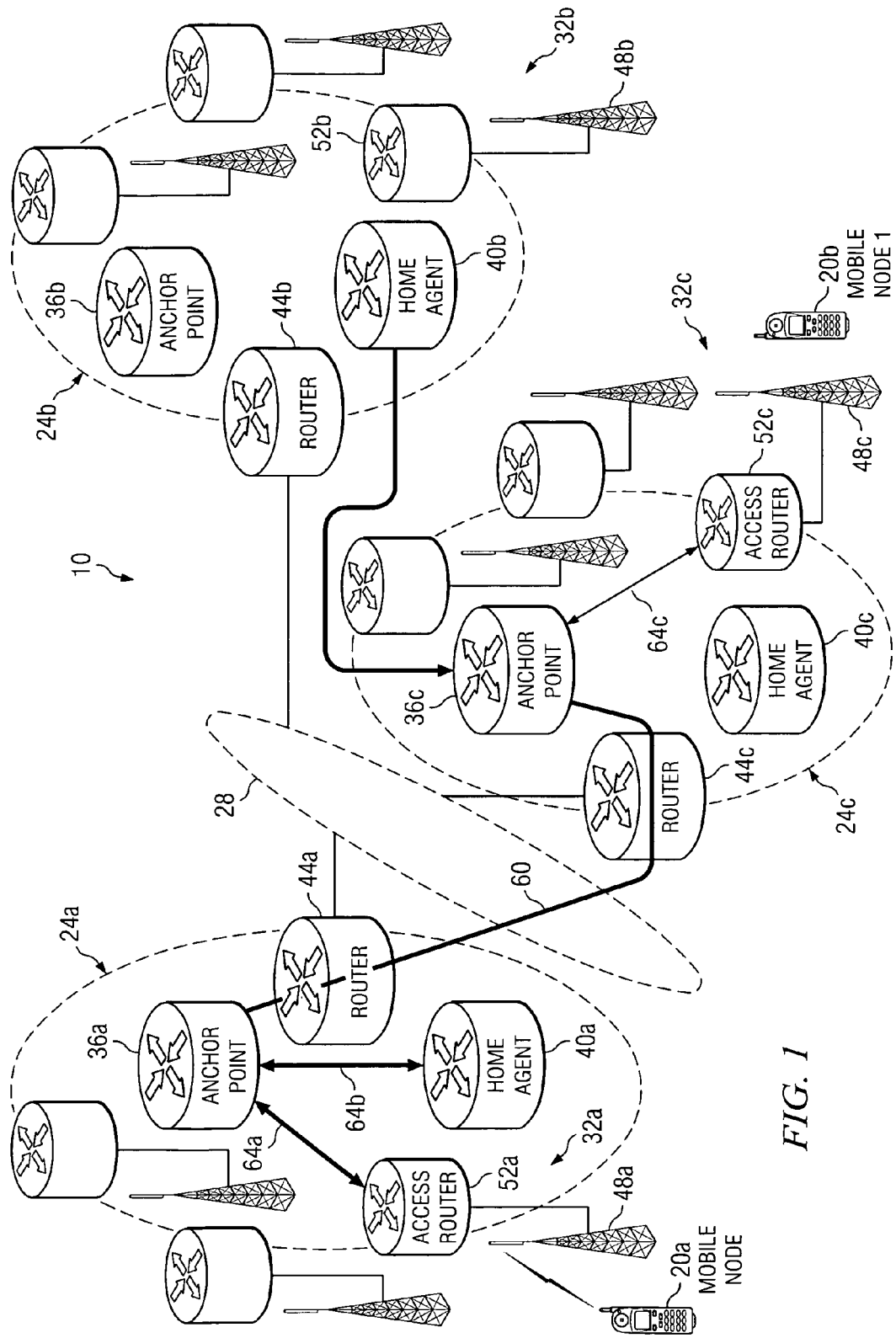
FIG. 1 is a block diagram illustrating one embodiment of a system that includes one or more anchor points that may be used to reserve network resources.

FIG. 1 is a block diagram illustrating one embodiment of a system 10 that includes one or more anchor points that may be used to reserve network resources. According to the embodiment, an anchor point may operate to reserve network resources to provide different quality of service levels. The anchor point may optimize a route prior to reserving the network resources.

According to the illustrated embodiment, mobile node 20 may represent any suitable logic comprising software, hardware, other logic, or any suitable combination of the preceding operable to communicate with a communication network. Mobile node 20 may comprise, for example, a personal digital assistant, a computer such as a laptop, a cellular telephone, a mobile handset, or any other device operable to communicate with system 10.

System 10 may operate to provide communication services such as communication sessions for endpoints such as mobile node 20. A communication session may refer to an active communication between endpoints, measured from endpoint to endpoint. Information is communicated in streams between endpoints during a communication session. Information may refer to data, text, audio, video, multimedia, other suitable type of information, or any combination of the preceding.

Information may be communicated in packets. A packet may comprise a bundle of data organized in a specific way for transmission, and a frame may comprise the payload of one or more packets organized in a specific way for transmission. A packet-based communication protocol such as Internet Protocol (IP) or mobile IP may be used to communicate the packets.

System 10 may utilize digital cellular protocols and technologies to provide the communication sessions. Example digital cellular protocols and technologies include those set by the Institute of Electrical and Electronics Engineers, Inc. (IEEE) 802.11 and 802.16 standards, the Global System for Mobile communications (GSM) standards, the Internet Engineering Task Force (IETF) standards, or other standard. GSM standards may support technology such as general packet radio service (GPRS) technologies, and IETF standards may support code division multiple access (CDMA) technologies.

System 10 may include network service providers that offer different levels of service to different streams. A differentiated services technology may be used to provide the different levels. As an example, the IETF Differentiated Services (DiffServ) technology may be used. According to DiffServ, the header of each packet may include a DiffServ Code Point (DSCP) marker that indicates a grade of service (GoS) for a stream. Nodes of the network apply the grade of service according to the marker. Any suitable differentiated services technology, however, may be used.

Network resources may be reserved by establishing a flow through system 10. A flow may refer to a path that is associated with one more senders and one more receivers. To establish a flow, a sender may transmit one or more path messages towards recipients. A path message may refer to a message that is used to initiate resource reservation for a flow. A path message may set up states on the routers, where the states allow resources to be reserved by reserve messages. The path messages are propagated to the routers along the path. A recipient confirms the flow and the path by sending a reserve message back to the sender. A reserve message requests reservation of resources, and may describe the stream to be received from the sender. As the reserve messages propagate back toward the sender, the routers determine whether or not to accept reservation and commit resources. If a router receives a reserve message and decides to accept the reservation, the router commits resources and sends the reserve messages to the next node of the path toward the sender.

A flow that provides a particular quality of service (QoS) may be established to allow system 10 to provide differentiated grades of service. To establish a flow that provides a particular quality of service, a sender may send path messages describing quality of service conditions for the flow. Quality of service conditions may refer to conditions that a node is requested to meet in order to participate in the flow. Quality of service conditions may include requirements such as bandwidth requirements and data parameters that describe the data to be sent along the flow. According to one example, the IETF resource reservation protocol (RSVP) may be used to support quality of service resource reservations.

According to one embodiment, the reservation of resources may be initiated in response to a trigger event. A trigger event may refer to an event that initiates an action. According to the embodiment, reservation of resources may be triggered by the receipt of a path message or a call control message.

According to the illustrated embodiment, system 10 includes a plurality of regions 24 and a network 28 coupled as shown. A region may refer to a network or a portion of a network that is supported by an anchor point 36. Region 24 may operate according to any suitable technique. According to one embodiment, region 24 may operate according to the IETF multi-protocol label switching (MPLS) technique.

According to the illustrated embodiment, a region 24 may include one or more access points 32, an anchor point 36, a home agent 40, and a router 44 coupled as shown. An access point 32 may represent a network point that couples a wireless network, such as a wireless radio network, to a wired network, such as a wired area network. Access point 32 may provide access services such as protocol conversion and packet encapsulation and decapsulation.

Access point 32 may comprise any suitable logic comprising software, hardware, other logic, or any suitable combination of the preceding operable to couple a wireless network to a wired network. According to the illustrated embodiment, access point 32 includes a base station 48 and an access router 52. A base station 48 typically includes a base transceiver station and a base station controller. The base transceiver station communicates signals to and from mobile node 20 through a wireless link. The wireless link is typically a radio frequency link that may be cellular in network organization. The base station controller manages the operation of the base transceiver station.

Access router 52 may represent any suitable logic comprising software, hardware, other logic, or any combination of the preceding operable to connect asynchronous devices such as mobile node 20 to realm 24. According to one embodiment, access router 52 may provide a point at which the Open Systems Interconnection (OSI) Model Layer 2 signaling meets Layer 3 signaling for mobile node 20.

Anchor point 36 may represent any suitable logic comprising software, hardware, other logic, or any combination of the preceding operable to aggregate management services for access routers 32. Anchor point 36 operates like an agent 40 from the viewpoint of access routers 52, and operates like an access router 52 from the viewpoint of the agent 40. According to one embodiment, anchor point 36 may encapsulate and decapsulate traffic such as data traffic.

Management services that may be aggregated include, for example, connection admission control (CAC) management, quality of service management, reservation management, mobility management, other management service, or any combination of the preceding. Connection admission control management refers to managing connection admission control for a communication session. Quality of service management refers to managing the quality of a service provided for a communication session. Reservation management refers to managing the reservation of resources for a communication session. Mobility management for a communication session refers to the ability to send and receive packets across the movement of the mobile node.

Nodes of regions 24 may communicate with each other using tunnels. According to the illustrated embodiment, IP tunnel 64a carries packets between access router 52a and anchor point 36a, IP tunnel 64b carries packets anchor point 36a and home agent 40a, and IP tunnel 64c carries packets between anchor point 36c access router 52c.

A tunnel 60 between anchor points 36 carries traffic between anchor points 36. Tunnel 60 may comprise a MPLS traffic engineering tunnel established through means other than normal Layer 3 routing to direct traffic over a path different from the path of normal Layer 3 routing.

Tunnel 60 may be dynamically adjusted. According to one embodiment, tunnel 60 may be dynamically resized in response to current situations. As an example, a tunnel head-end may measure traffic sent through tunnel 60. The bandwidth of tunnel 60 may be dynamically adjusted in accordance with the measured traffic. As another example, the aggregate requirement at an anchor point 36 that uses a tunnel 60 may be computed. The aggregate requirement may be computed in any suitable manner, such as according to the sum of the bandwidth requested by the sessions, the sum of the bandwidth actually used by the sessions, other parameter, or any combination of the preceding. The tunnel may be resized in accordance with the aggregate requirement.

The number of tunnels 60 that may be established may be based on the number of anchor points 36. Different tunnels 60 may be set up between the same pair of anchor points 36. As an example, different tunnels may be set up for different classes of service. As another example, different tunnels 60 may be set up for different types of traffic, for example, one for voice traffic and one for video traffic.

Home agent 40 of mobile node 20 may represent an agent that maintains the address of mobile node 20 and forwards packets to mobile node 20. An agent may refer any suitable logic comprising software, hardware, other logic, or any suitable combination of the preceding operable to provide mobility management services for mobile node 20. A foreign agent of mobile node 20 may represent an agent that provides home agent 40 of mobile node 20 with a care-of address to which packets for mobile node 20 node may be forwarded.

If mobile node 20 is in an area serviced by home agent 40, home agent 40 forwards traffic to the location address of mobile node 20. If mobile node 20 moves to an area serviced by a foreign agent, the foreign agent notifies home agent 40 that mobile node 20 has moved, and sends a care-of address for mobile node 20 to home agent 40. Home agent 40 forwards traffic to the care-of address.

Router 44 may represent any suitable logic comprising software, hardware, other logic, or any suitable combination of the preceding operable to interconnect with network 28. Router 44 may convert communications between different communication protocols. For example, router 44 convert communications from a protocol used by region 24*a* to a protocol used by network 28, or vice-versa.

Network 28 comprises a communication network that allows networks or devices to communicate with other networks or devices. A communication network may refer to a network that allows devices to communicate with each other. A communication network may comprise all or a portion of a public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding.

Network 28 may include any suitable networks or devices that allow mobile node 20 to communicate with other networks or devices. As an example, network 28 may include an operator network comprising a communication network that is operated by a specific operator. An operator network may operate according to any suitable technology, such as wireless, cable, optical, other wireline or wireless technology, or any combination of the preceding. As another example, network 28 may include a server that provides functionality requested by mobile node 20. Functionality may refer to establishing a telephony service, providing information, other functionality, or any combination of the preceding.

A component of system 10 may include an interface, logic, memory, other component, or any suitable combination of the preceding. As used in this document, "interface" refers to any suitable structure of a device operable to receive input for the device, send output from the device, perform suitable processing of the input or output or both, or any combination of the preceding, and may comprise one or more ports, conversion software, or both. Logic manages the operation of a device, and may comprise any suitable hardware, software, or combination of hardware and software. For example, logic may include a processor. As used in this document, "processor" refers to any suitable device operable to execute instructions and manipulate data to perform operations.

As used in this document, "memory" refers to any structure operable to store and facilitate retrieval of information used by a processor, and may comprise Random Access Memory (RAM), Read Only Memory (ROM), magnetic drives, disk drives, Compact Disk (CD) drives, Digital Video Disk (DVD) drives, removable media storage, any other suitable data storage device, or a combination of any of the preceding.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of anchor point 36 and router 44 may be performed by one device, or the operations of anchor point 36 may be performed by more than one device. Additionally, operations of system 10 may be performed using any suitable logic comprising software, hardware, other logic, or any suitable combination of the preceding. As used in this document, "each" refers to each member of a set or each member of a subset of a set.

Figure 2:
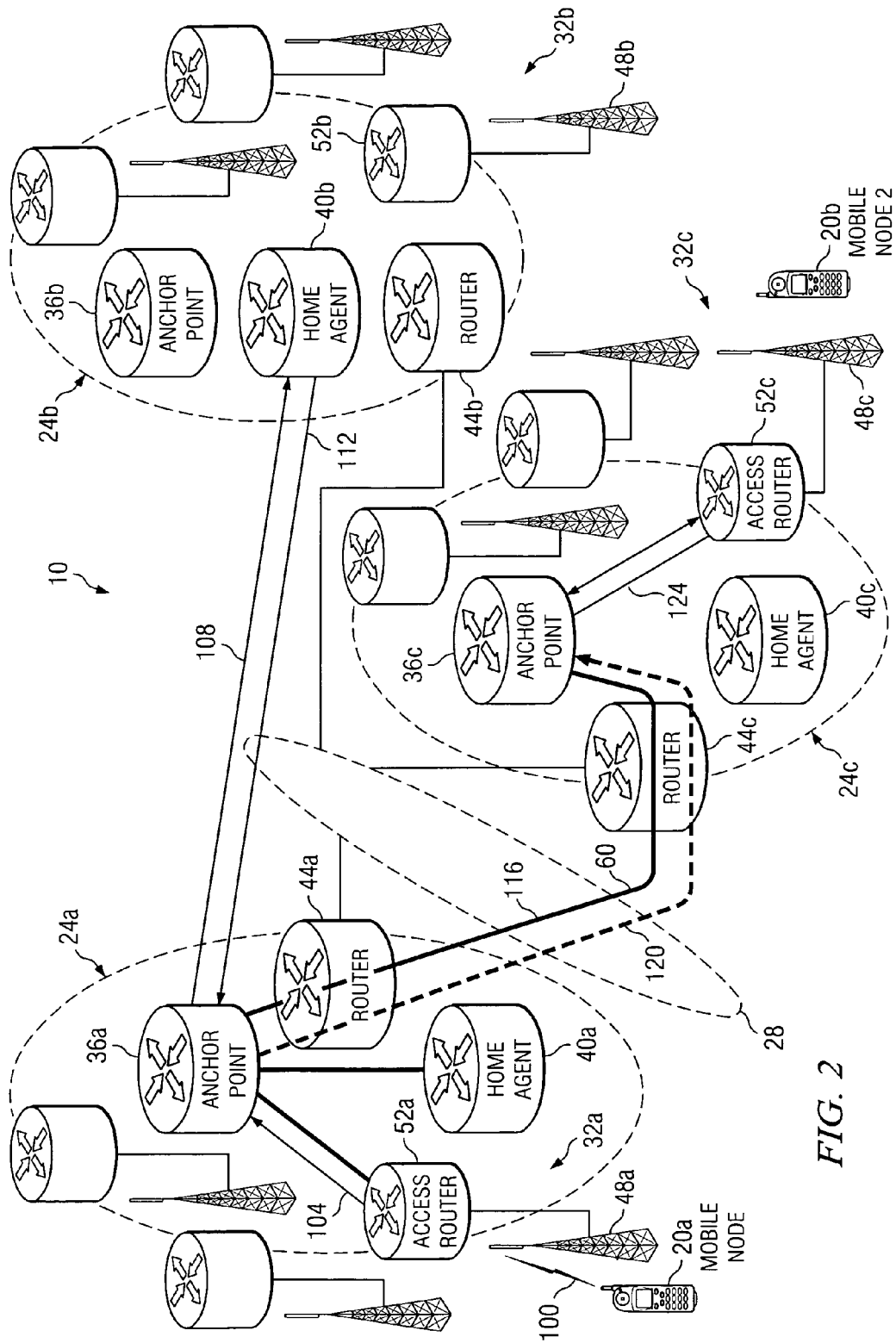
FIG. 2 is a block diagram illustrating one embodiment of a method for reserving resources for a communication session that may be used with the system of FIG. 1.

FIG. 2 is a block diagram illustrating one embodiment of a method for reserving resources for a communication session that may be used with system 10 of FIG. 1. According to the embodiment, route optimization is performed prior to reserving resources for different quality of service levels.

The method begins at step 100, where mobile node 20*a* initiates a communication session with mobile node 20*b* through access router 52*a*. A path message to reserve a path from mobile node 20*a* to mobile node 20*b* is generated. As an example, the path message may comprise an RSVP path message for a specific quality of service and call access control. The resource reservation may be triggered at the same time as a radio resource reservation. For example, a per-session RSVP may be triggered at the same time as a per-session radio quality of service/call access control is triggered. Mobile node 20*a*, access router 52*a*, or other suitable node that can support a reservation protocol may generate the path message.

Access router 52*a* tunnels the path message to anchor point 36*a* through tunnel 64*a* at step 104. Anchor point 36*a* sends an optimization request to home agent 40*b* of mobile node 20*b* at step 108. An optimization request may refer to a message that requests that optimization procedure is performed. In response to the optimization request, home agent 40*b* may determine that communication to mobile node 20*b* may be optimized by communicating with mobile node 20*b* using a care-of address for mobile node 20*b*. According to the illustrated example, the care-of address for mobile node 20*b* is the address for anchor point 36*c*.

Home agent 40*c* sends an optimization response to anchor point 36*a* at step 112. An optimization response may refer to a message indicating that the optimization request has been granted. The optimization response includes the care-of address of mobile node 20*b* indicating that mobile node 20*b* may be reached via anchor point 36*c*.

Anchor point 36*a* may use the care-of address to set up a path directly with anchor point 36*c* at step 116. The path may comprise tunnel 60. Anchor point 36*a* performs an admission procedure such as a connection admission control procedure. Anchor point 36*a* sends a path message to anchor point 36*c* at step 120, which forwards the message to access router 52 at step 124. The path message is used to reserve resources. The method then terminates.

Modifications, additions, or omissions may be made to the method without departing from the scope of the invention. The method may include more, fewer, or other steps. Additionally, steps may be performed in any suitable order without departing from the scope of the invention.

Figure 3:
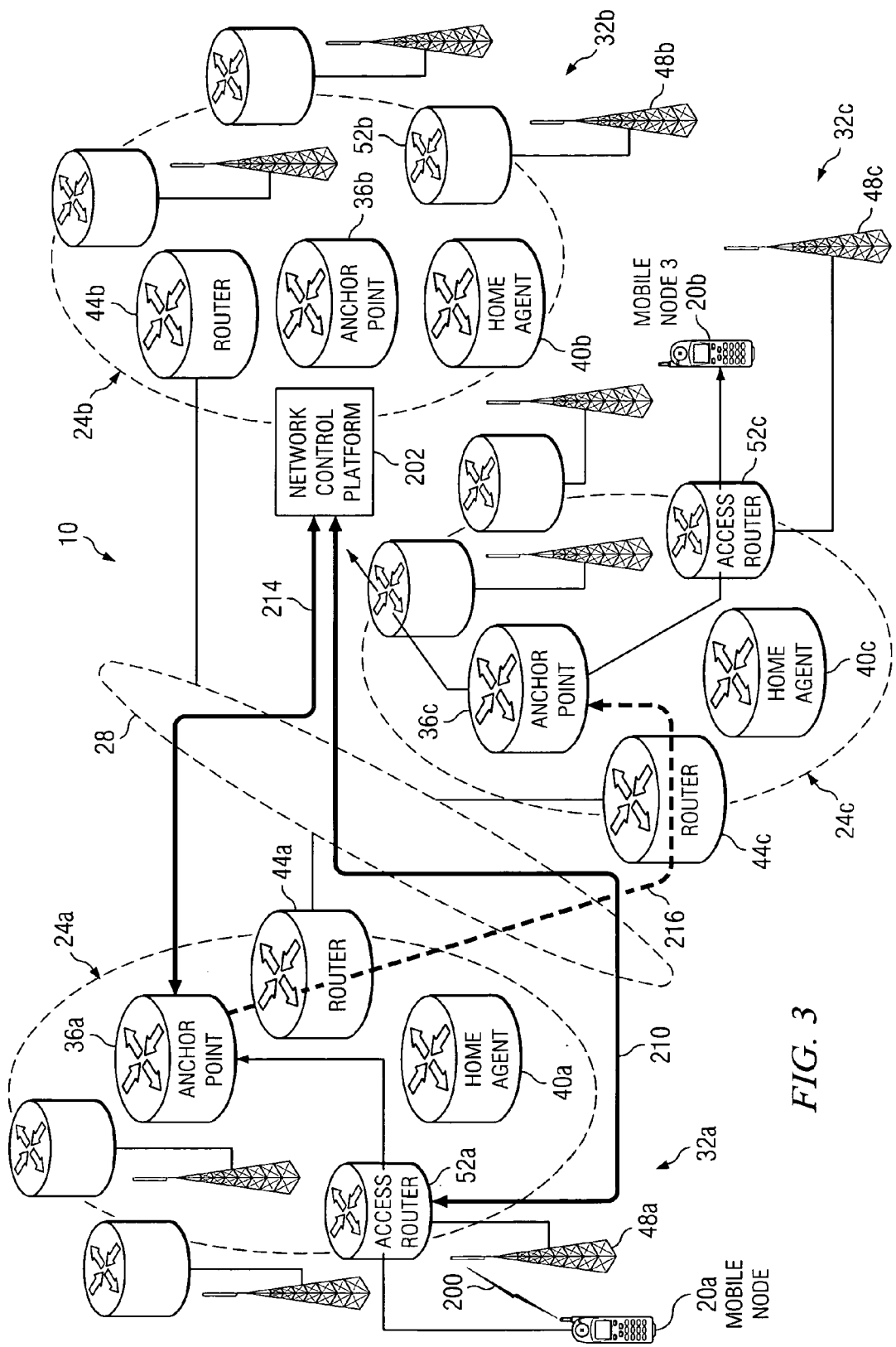
FIG. 3 is a block diagram illustrating another embodiment of a method for reserving resources for a communication session.

FIG. 3 is a block diagram illustrating another embodiment of a method for reserving resources for a communication session. According to the embodiment, a network control platform 202 is used to provide call control trigger events. Network control platform 202 may represent a point of a network where management and control functions are implemented. Example functions may include, for example, authenticated functions, session management functions, quality of service functions, mobility management functions, other functions, or a combination of the preceding.

The method begins at step 200, where mobile node 20*a* initiates a communication session with mobile node 20*b* through access router 52*a*. Access router 52*a* communicates with network control platform 202 in order to trigger per-session radio procedures at step 210. A radio procedure may refer to a procedure performed to establish a communication session with a mobile node 20. Examples of a per-session radio procedure may include a radio quality service procedure, a call access control procedure, or other procedure.

Anchor point 36*a* communicates with network control platform 202 to trigger per-session network procedures at step 214. As an example, a per-session call access control procedure may be triggered. Network control platform 202 may provide a call control trigger event that initiates the reservation procedure. Processing may be triggered for each session of the anchor point 36*a*. Anchor point 36*a* sets up a path directly with anchor point 36*c* at step 216. The path may comprise tunnel 60. The path may be used to send path messages to set up resource reservation over tunnel 60. The method then terminates.

Modifications, additions, or omissions may be made to the method without departing from the scope of the invention. The method may include more, fewer, or other steps. Additionally, steps may be performed in any suitable order without departing from the scope of the invention.

Figure 4:
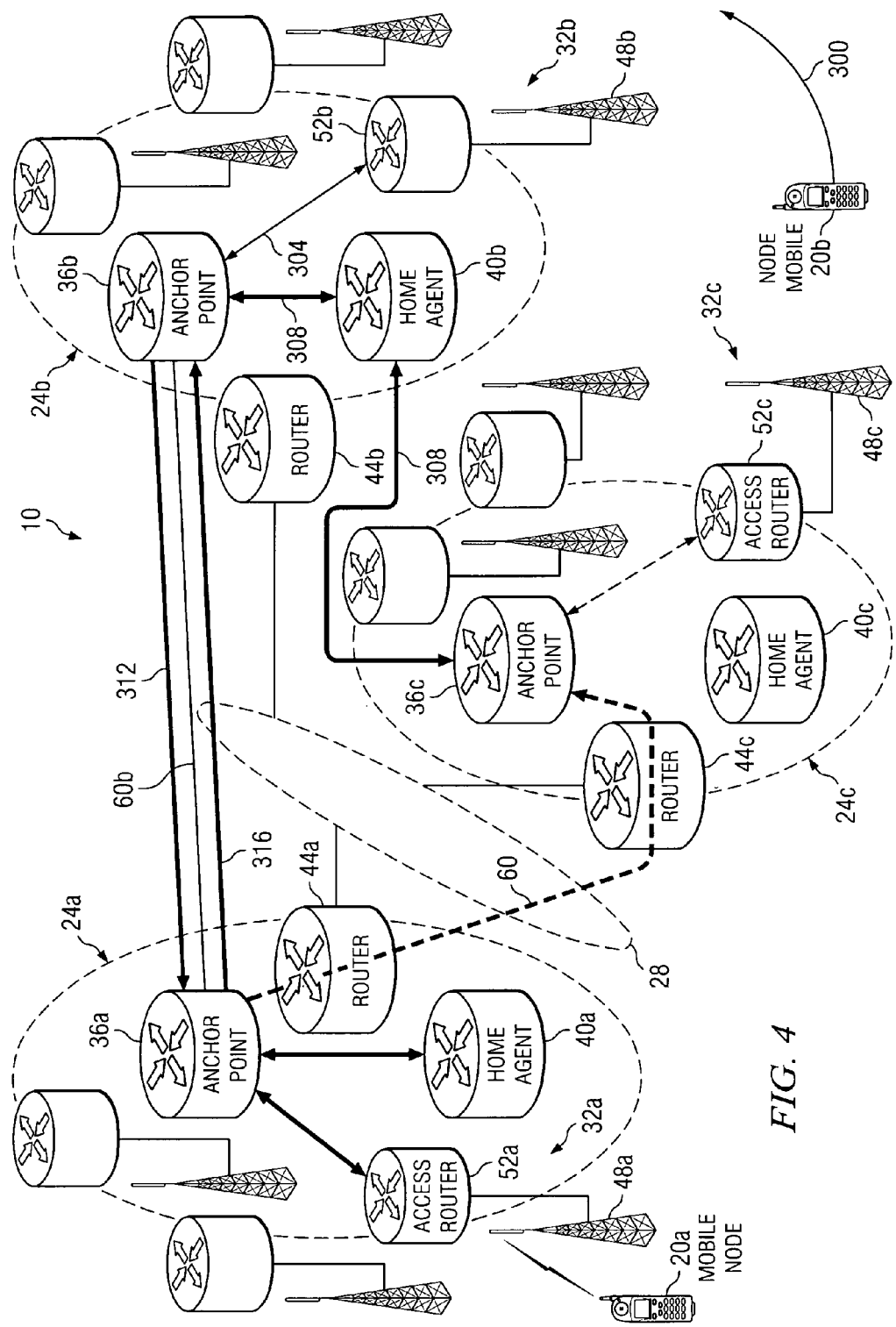
FIG. 4 is a block diagram illustrating one embodiment of a method of providing mobility support for a mobile node.

FIG. 4 is a block diagram illustrating one embodiment of a method of providing mobility support for mobile node 20*b*. According to the embodiment, separate bearer control and call control paths may be used. According to the embodiment, a bearer control trigger event may be used at every hop.

The method begins at step 300, where mobile node 20*b* moves from region 24*c* to 24*b*. Mobile node 20*b* registers with access router 52*b*, which notifies anchor point 36*b* at step 304. Home agent 40*b* updates anchor points 36*b* and 36*c* with the new location of mobile node 20*b* at step 308. The updated information indicates that mobile node 20*b* is engaged in a communication session with mobile node 20*a*, which can be reached through anchor point 36*a*.

Anchor point 36*b* sends an optimization response to anchor point 36*a* at step 312. A new tunnel 60*b* is established between anchor point 36*a* and anchor point 36*b*. Anchor point 36*a* performs a call access control procedure over tunnel 60*b* at step 316. The method then terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a tunnel may be established between the anchor points of the mobile nodes of a communication session. The tunnel may provide for more efficient reservation of network resources. Another technical advantage of one embodiment may be that the tunnel may be used to aggregate network reservation for a number of communication sessions.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for requesting a network resource for a communication session, comprising:
   facilitating a communication session between a mobile node and an endpoint;
   providing a trigger event by a network control platform, the network control platform configured to implement mobility management functions and call access control procedures;
   receiving the trigger event at a first anchor point, the first anchor point configured to aggregate one or more management services for a plurality of first access routers, the first anchor point operating like a home agent from the viewpoint of an access router, the first anchor point operating like an access router from the viewpoint of the home agent, the plurality of first access routers comprising a first access router used by the mobile node, the trigger event indicating that reservation of a network resource is being requested for the communication session;
   sending, by the first anchor point, an optimization request requesting performance of an optimization procedure;
   receiving, at the first anchor point, an optimization response indicating that the optimization request has been granted, the optimization response comprising a care-of address of the endpoint, the care-of address identifying a second anchor point;
   identifying the second anchor point from the care-of address, the second anchor point configured to aggregate the one or more management services for a plurality of second access routers, the plurality of second access routers comprising a second access router used by the endpoint;
   establishing, by the first anchor point, a tunnel directly between the first anchor point and the second anchor point using the care-of address;
   dynamically resizing the tunnel in response to measured traffic sent through the tunnel; and
   initiating reservation of the network resource for the communication session over the tunnel.

2. The method of claim 1, wherein:
   receiving the trigger event at the first anchor point further comprises:
      receiving the trigger event indicating a quality of service condition, the quality of service condition to be satisfied by the network resource; and
   initiating reservation of the network resource further comprises:
      requesting the network resource according to the quality of service condition.

3. The method of claim 1, wherein:
   receiving the trigger event at the first anchor point further comprises:
      receiving the trigger event comprising a path message, the path message indicating a quality of service; and
   initiating reservation of the network resource further comprises:
      requesting the network resource according to the quality of service.

4. The method of claim 1, wherein initiating reservation of the network resource further comprises:
   performing the reservation in the network.

5. The method of claim 1, a management service of the one or more management services comprising at least one of a connection admission control management service, a mobility management service, and a quality of service management service.

6. The method of claim 1, further comprising:
   initiating route optimization for the flow to identify a path for the tunnel.

7. A first anchor point operable to request a network resource for a communication session, comprising:
   an interface operable to:
      receive a plurality of messages to facilitate a communication session between a mobile node and an endpoint, the mobile node associated with the first anchor point; and
      receive a trigger event provided by a network control platform, the network control platform configured to implement mobility management functions and call access control procedures, the trigger event indicating that reservation of a network resource is being requested for the communication session; and
send an optimization request requesting performance of an optimization procedure;
receive an optimization response indicating that the optimization request has been granted, the optimization response comprising a care-of address of the endpoint, the care-of address identifying a second anchor point;
a processor coupled to the interface and operable to:
aggregate one or more management services for a plurality of first access routers, operate like a home agent from the viewpoint of an access router, and operate like an access router from the viewpoint of the home agent, the plurality of first access routers comprising a first access router used by the mobile node;
identify the second anchor point from the care-of address, the second anchor point configured to aggregate the one or more management services for a plurality of second access routers, the plurality of second access routers comprising a second access router used by the endpoint;
establish a tunnel directly between the first anchor point and the second anchor point using the care-of address;
dynamically resize the tunnel in response to measured traffic sent through the tunnel; and
initiate reservation of the network resource for the communication session over the tunnel.

8. The first anchor point of claim 7, wherein:
the interface is operable to receive the trigger event by:
receiving the trigger event indicating a quality of service condition, the quality of service condition to be satisfied by the network resource; and
the processor is operable to initiate reservation of the network resource by:
requesting the network resource according to the quality of service condition.

9. The first anchor point of claim 7, wherein:
the interface is operable to receive the trigger event by:
receiving the trigger event comprising a path message, the path message indicating a quality of service; and
the processor is operable to initiate reservation of the network resource by:
requesting the network resource according to the quality of service.

10. The first anchor point of claim 7, the interface is operable to receive the trigger event by:
receiving a call control message.

11. The first anchor point of claim 7, a management service of the one or more management services comprising at least one of a connection admission control management service, a mobility management service, and a quality of service management service.

12. The first anchor point of claim 7, the processor is further operable to:
initiate route optimization for the flow to identify a path for the tunnel.

13. The first anchor point of claim 7, wherein:
the interface is operable to receive the trigger event by:
receiving the trigger event indicating a quality of service condition, the quality of service condition to be satisfied by the network resource; and
receiving a call control message; and
the processor is operable to:
initiate reservation of the network resource by:
requesting the network resource according to the quality of service condition; and
initiate route optimization for the flow to identify a path for the tunnel.

14. A system for requesting a network resource for a communication session, comprising:
means for facilitating a communication session between a mobile node and an endpoint;
means for providing a trigger event by a network control platform, the network control platform configured to implement mobility management functions and call access control procedures;
means for receiving a trigger event at a first anchor point, the first anchor point configured to aggregate one or more management services for a plurality of first access routers, the first anchor point operating like a home agent from the viewpoint of an access router, the first anchor point operating like an access router from the viewpoint of the home agent, the plurality of first access routers comprising a first access router used by the mobile node, the trigger event indicating that reservation of a network resource is being requested for the communication session;
means for sending, by the first anchor point, an optimization request requesting performance of an optimization procedure;
means for receiving, at the first anchor point, an optimization response indicating that the optimization request has been granted, the optimization response comprising a care-of address of the endpoint, the care-of address identifying a second anchor point;
means for identifying the second anchor point from the care-of address, the second anchor point configured to aggregate the one or more management services for a plurality of second access routers, the plurality of second access routers comprising a second access router used by the endpoint;
means for establishing, by the first anchor point, a tunnel directly between the first anchor point and the second anchor point using the care-of address;
means for dynamically resizing the tunnel in response to measured traffic sent through the tunnel; and
means for initiating reservation of the network resource for the communication session over the tunnel.

15. A method for optimizing a path for a communication session, comprising:
facilitating a plurality of communication sessions between a plurality of mobile nodes and a plurality of endpoints, the mobile nodes communicating through a first anchor point, the first anchor point configured to aggregate one or more management services for a plurality of first access routers used by the mobile nodes, the first anchor point operating like a home agent from the viewpoint of an access router, the first anchor point operating like an access router from the viewpoint of the home agent, the endpoints communicating through a second anchor point, the second anchor point configured to aggregate the one or more management services for a plurality of second access routers used by the endpoints;
receiving a plurality of trigger events at the first anchor point, a trigger event provided by a network control platform configured to implement mobility management functions and call access control procedures, the trigger event indicating that reservation of a network resource is being requested for a communication session;
sending, by the first anchor point, an optimization request requesting performance of an optimization procedure;

receiving, at the first anchor point, an optimization response indicating that the optimization request has been granted, the optimization response comprising a care-of address of the endpoint, the care-of address identifying a second anchor point;
identifying the second anchor point from the care-of address;
establishing, by the first anchor point, a tunnel directly between the first anchor point and the second anchor point using the care-of address;
dynamically resizing the tunnel in response to measured traffic sent through the tunnel; and
initiating reservation of the network resources for the communication sessions over the tunnel.

16. The method of claim 15, wherein:
receiving the plurality of trigger events at the first anchor point further comprises:
receiving the trigger events, each trigger event indicating a quality of service condition, the quality of service condition to be satisfied by the network resource; and
initiating reservation of the network resources further comprises:
requesting the network resources according to the quality of service conditions.

17. A first anchor point for optimizing a path for a communication session, comprising:
an interface operable to:
receive a plurality of messages to facilitate a plurality of communication sessions between a plurality of mobile nodes and a plurality of endpoints, the mobile nodes communicating through the first anchor point, the first anchor point configured to aggregate one or more management services for a plurality of first access routers used by the mobile nodes, the first anchor point operating like a home agent from the viewpoint of an access router, the first anchor point operating like an access router from the viewpoint of the home agent, the endpoints communicating through a second anchor point, the second anchor point configured to aggregate the one or more management services for a plurality of second access routers used by the endpoints; and
receive a plurality of trigger events, a trigger event provided by a network control platform configured to implement mobility management functions and call access control procedures, the trigger event indicating that reservation of a network resource is being requested for a communication session;
send an optimization request requesting performance of an optimization procedure;
receive an optimization response indicating that the optimization request has been granted, the optimization response comprising a care-of address of the endpoint, the care-of address identifying a second anchor point; and
a processor coupled to the interface and operable to:
identify the second anchor point from the care-of address;
establish a tunnel directly between the first anchor point and the second anchor point using the care-of address;
dynamically resize the tunnel in response to measured traffic sent through the tunnel; and
initiate reservation of the network resources for the communication sessions over the tunnel.

18. The first anchor point of claim 17, wherein:
the interface is operable to receive the trigger event by:
receiving the trigger events, each trigger event indicating a quality of service condition, the quality of service condition to be satisfied by the network resource; and
the processor is operable to initiate reservation of the network resources by:
requesting the network resources according to the quality of service conditions.

19. A system for optimizing a path for a communication session, comprising:
means for facilitating a plurality of communication sessions between a plurality of mobile nodes and a plurality of endpoints, the mobile nodes communicating through a first anchor point, the first anchor point configured to aggregate one or more management services for a plurality of first access routers used by the mobile nodes, the first anchor point operating like a home agent from the viewpoint of an access router, the first anchor point operating like an access router from the viewpoint of the home agent, the endpoints communicating through a second anchor point, the second anchor point configured to aggregate the one or more management services for a plurality of second access routers used by the endpoints;
means for receiving a plurality of trigger events at the first anchor point, a trigger event provided by a network control platform configured to implement mobility management functions and call access control procedures, the trigger event indicating that reservation of a network resource is being requested for a communication session;
means for sending, by the first anchor point, an optimization request requesting performance of an optimization procedure;
means for receiving, at the first anchor point, an optimization response indicating that the optimization request has been granted, the optimization response comprising a care-of address of the endpoint, the care-of address identifying a second anchor point;
means for identifying the second anchor point from the care-of address;
means for establishing, by the first anchor point, a tunnel directly between the first anchor point and the second anchor point using the care-of address;
means for dynamically resizing the tunnel in response to measured traffic sent through the tunnel; and
means for initiating reservation of the network resources for the communication sessions over the tunnel.

20. A network for optimizing a path for a communication session, comprising:
a first anchor point and a second anchor point operable to:
facilitate a plurality of communication sessions between a plurality of mobile nodes and a plurality of endpoints, the mobile nodes communicating through a first anchor point, the first anchor point configured to aggregate one or more management services for a plurality of first access routers used by the mobile nodes, the first anchor point operating like a home agent from the viewpoint of an access router, the first anchor point operating like an access router from the viewpoint of the home agent, the endpoints communicating through a second anchor point, the second anchor point configured to aggregate the one or more management services for a plurality of second access routers used by the endpoints;
the first anchor point further operable to:
receive a plurality of trigger events, a trigger event provided by a network control platform configured to implement mobility management functions and call access control procedures, the trigger event indicating that reservation of a network resource is being requested for a communication session;

send an optimization request requesting performance of an optimization procedure;

receive an optimization response indicating that the optimization request has been granted, the optimization response comprising a care-of address of the endpoint, the care-of address identifying a second anchor point;

identify the second anchor point from the care-of address;

establish a tunnel directly between the first anchor point and the second anchor point using the care-of address;

dynamically resize the tunnel in response to measured traffic sent through the tunnel; and initiating reservation of the network resources for the communication sessions over the tunnel.

21. The network of claim 20, wherein the first anchor point is further operable to:

receive the plurality of trigger events by:

receiving the trigger events, each trigger event indicating a quality of service condition, the quality of service condition to be satisfied by the network resource; and initiate reservation of the network resources by:

requesting the network resources according to the quality of service conditions.

22. The network of claim 20, wherein at least one trigger event comprises a call control message.

23. The network of claim 20, further comprising a home agent operable to inform the first anchor point of the second anchor point.

24. The network of claim 20, wherein:

the first anchor point is further operable to:

receive the plurality of trigger events by:

receiving the trigger events, each trigger event indicating a quality of service condition, the quality of service condition to be satisfied by the network resource; and initiate reservation of the network resources by:

requesting the network resources according to the quality of service conditions; and at least one trigger event comprises a call control message; and further comprising a home agent operable to inform the first anchor point of the second anchor point.

* * * * *